US009509227B2

(12) United States Patent
Yedinak et al.

(10) Patent No.: US 9,509,227 B2
(45) Date of Patent: Nov. 29, 2016

(54) MOSFET BRIDGE CIRCUIT (71) Applicant: Fairchild Semiconductor Corporation, San Jose, CA (US)

(72) Inventors: Joseph A. Yedinak, Mountain Top, PA (US); Scott Pearson, Humlock Creek, PA (US); Mark L. Rinehimer, Mountain Top, PA (US); Sungjin Kuen, Seoul (KR)

(73) Assignee: Fairchild Semiconductor Corporation, San Jose, CA (US)

( * ) Notice: Subject to any disclaimer, the term of this patent is extended or adjusted under 35 U.S.C. 154(b) by 0 days.

(21) Appl. No.: 14/593,691

(22) Filed: Jan. 9, 2015

(65) Prior Publication Data
US 2015/0194906 A1  Jul. 9, 2015

Related U.S. Application Data (60) Provisional application No. 61/925,646, filed on Jan. 9, 2014, provisional application No. 62/005,589, filed on May 30, 2014.

(51) Int. Cl.
*H02M 7/06* (2006.01)
*H02M 7/23* (2006.01)

(52) U.S. Cl.
CPC ............... *H02M 7/06* (2013.01); *H02M 7/23* (2013.01)

(58) Field of Classification Search
CPC .... H02M 5/4585; H02M 7/062; H02M 7/08; H02M 7/19; H02M 7/1626; H02M 7/06; H02M 1/32; H02M 3/33592; Y02B 70/126; H02H 7/127; H02J 1/102
USPC ......... 363/37, 44, 52, 53, 65, 67–70, 84, 87, 363/88, 89, 92, 125–126, 127
See application file for complete search history.

(56) References Cited

U.S. PATENT DOCUMENTS

| 7,500,118 | B2  |   | 3/2009  | Crawley et al. |           |
|-----------|-----|---|---------|----------------|-----------|
| 8,531,226 | B2  |   | 9/2013  | Montalbo et al.|           |
| 8,574,712 | B2  | * | 11/2013 | Wood ........................ | B05D 7/54 |
|           |     |   |         |                | 428/332   |
| 2009/0273959 | A1 |  | 11/2009 | Sells |           |
| 2011/0199799 | A1 | * | 8/2011 | Hui ........................ | H02M 7/219 |
|           |     |   |         |                | 363/127   |
| 2012/0155131 | A1 | * | 6/2012 | Moreno-Castaneda . | H02M 7/23 |
|           |     |   |         |                | 363/69    |
| 2014/0104908 | A1 | * | 4/2014 | Mehringer .............. | H02M 1/32 |
|           |     |   |         |                | 363/89    |

OTHER PUBLICATIONS

Billy Sevel, MOSFETs: Increased Efficiency in Bridge Rectifiers, Jun. 7, 2007.*
"Fairchild GreenBridge(TM) Solution to Replace Conventional Diode Bridge in Power Over Ethernet Applications", Fairchild Semiconductor Corporation, 2012, 4 pages.
Sevel, Billy, "MOSFETs: Increased Efficiency in Bridge Rectifiers", EDN Power Technology, Part Two, Jun. 2007, pp. 21-22.
Unterdorfer, Pascal, "Power over Ethernet", IEEE 802.3af, Hirschmann Automation and Control GmbH, Jun. 30, 2008, 10 pages.
"Testing Power over Ethernet (PoE) Enabled Systems", White Paper, Fluke Networks, 2006, 4 pages.
"Ideal Diode Bridge Controller", Linear Technology Corporation, 2012, 12 pages.

\* cited by examiner

*Primary Examiner* — Nguyen Tran
(74) *Attorney, Agent, or Firm* — Brake Hughes Bellermann LLP (57) ABSTRACT

In a general aspect, a bridge circuit can include a first bridge including a first plurality of MOSFETs and including a first input terminal and a second input terminal, and a second bridge including a second plurality of MOSFETs and including a third input terminal and a fourth input terminal. The first bridge and the second bridge can be coupled in parallel and being coupled to a first load terminal and a second load terminal.

19 Claims, 7 Drawing Sheets

MOSFET BRIDGE CIRCUIT

RELATED APPLICATIONS

This application claims priority to and the benefit of U.S. Provisional Application No. 61/925,646, filed Jan. 9, 2014, entitled, "METHODS AND APPARATUS RELATED TO A MOSFET BRIDGE CIRCUIT," and claims priority to and the benefit of U.S. Provisional Application No. 62/005,589, filed May 30, 2014, entitled, "METHODS AND APPARATUS RELATED TO A MOSFET BRIDGE CIRCUIT," both of which are incorporated herein by reference in their entireties.

TECHNICAL FIELD

This description relates to a bridge circuit for providing a polarity insensitive power connection.

BACKGROUND

Bridge rectifier circuits can be used at an input of a device so that the input will be insensitive to the polarity of a power source coupled to the device. The device itself may be sensitive to the polarity of the power source, but the bridge rectifier can be configured to provide the proper polarity to the device when the polarity of the power source is reversed. Without the bridge rectifier circuit at the input, the device could be damaged when the polarity of the power source is improperly coupled to the device with a reversed polarity. Some systems have specifications that require the systems to operate properly in spite of reversal in the polarity of applied power.

Many known bridge rectifier circuits can be configured using typical diodes (e.g., PN junction diodes). These known bridge rectifier circuits often have relatively high energy losses that are undesirable in many applications. Thus, a need exists for systems, methods, and apparatus to address the shortfalls of present technology and to provide other new and innovative features.

BRIEF SUMMARY

In a general aspect, a bridge circuit can include a first bridge including a first plurality of MOSFETs and including a first input terminal and a second input terminal, and a second bridge including a second plurality of MOSFETs and including a third input terminal and a fourth input terminal. The first bridge and the second bridge can be coupled in parallel and being coupled to a first load terminal and a second load terminal.

The details of one or more implementations are set forth in the accompanying drawings and the description below. Other features will be apparent from the description and drawings, and from the claims.

DETAILED DESCRIPTION

Figure 1:
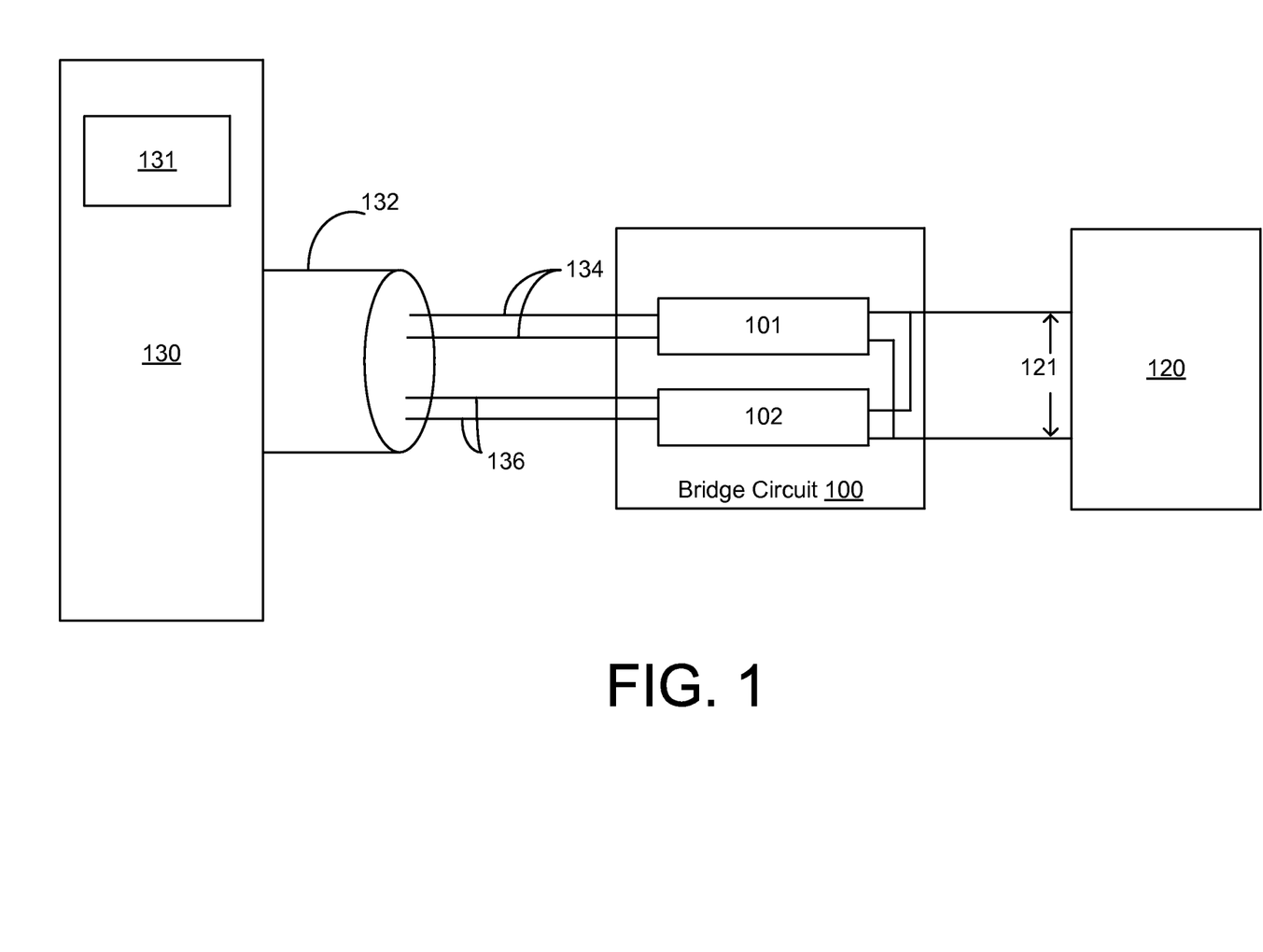
FIG. 1 is an illustration of an example bridge circuit.

FIG. 1 illustrates an example bridge circuit 100 (which can also be referred to as a polarity switching circuit) as an intermediate power interface component between a power sourcing equipment (PSE) 130 and a powered device (PD) 120 (which can also be referred to as a load). Bridge circuit 100 includes an arrangement of metal-oxide-semiconductor field effect transistor (MOSFET) devices to rectify or convert AC voltages or power supplied by PSE 130 into direct current (DC) voltages or power applied to PD 120. Bridge circuit 100 may also be used to block a DC voltage supplied by PSE 130 to PD 120 if the DC voltage has an incorrect polarity. In some implementations (e.g., in a power over Ethernet (PoE) application), PD 120 may be supplied with power by PSE 130 over, for example, a cable such as an Ethernet cable 132. The Ethernet cable 132 may provide both data connection and electrical power to PD 120. The power carried over Ethernet cable 132 may be rectified by bridge circuit 100 before being transferred to input port 121 of PD 120.

In some implementations, the MOSFET devices can include vertical trench MOSFET devices and/or lateral MOSFET devices. In some implementations, the MOSFET devices can include MOSFET devices using various types of substrates such as silicon substrates, silicon carbide substrates, and/or so forth.

In, for example, PoE applications, industry standards have been promulgated to ensure that the power sourcing equipment (e.g., PSE 130) and power-receiving devices (e.g., PD 120) are compatible with each other for safe transfer of power over Ethernet cables (e.g., Ethernet cable 132). IEEE standards (e.g., IEEE 802.3af and 802.3at) describe a PoE system to safely transfer electrical power, along with data, to remote devices over standard data cables (e.g., CAT3/CAT5/CAT5e/CAT6) in an Ethernet network. Under the IEEE standards, power may be carried, for example, on one of two alternate pairs of power-carrying conductors 134, 136 in Ethernet cable 132. For example, power may be carried on the same conductors or wires as the data, or power may be carried on dedicated conductors or wires in the Ethernet cable. For example, as shown in FIG. 1, power may be carried on (e.g., transmitted on) power-carrying conductors 134 that also carry (or transmit) data in Ethernet cable 132, or power may be carried on dedicated power-carrying conductors 136 that do not carry (or transmit) data in Ethernet cable 132. Bridge circuit 100, which is used to rectify the carried power, may be a dual bridge circuit (i.e. include two bridges—bridge 101 and bridge 102, in parallel). The dual bridge circuit (i.e., bridge circuit 100) described herein resolves several issues related to (1) resistance detection requirements and (2) voltage backfeed requirements in accordance with the IEEE standards.

In some implementations, bridge 101 and bridge 102 may be configured for connection to the alternate pairs of power-carrying conductors 134 and 136 of Ethernet cable 132. Depending on which pair of power-carrying conductors 134 or 136 is used to carry power, an appropriate one of bridge 101 and bridge 102 may be used to rectify the carried power. Because the bridge circuit 100 includes MOSFET devices, bridge circuit 100 can be referred to as a MOSFET bridge circuit. In addition, bridge 101 and bridge 102 can each be referred to as MOSFET bridges. In some implementations each of the bridges 101, 102 can include one or more branches, and the branches can each include one or more zener-resistor networks, which are described in more detail by way of example below.

As mentioned above, the IEEE standards (and other industry standards) specify parameters such as an acceptable input resistance of a PD and an acceptable maximum voltage for safe transfer of power in a PoE implementation. For example, PD 120 may indicate that it is standards-compliant by having, for example, about 25 kΩ as its input load that is presented to the powered pairs of wires of a data cable (e.g., Ethernet cable 132) in a PoE implementation. Further, in the case of bridge circuit 100 where one bridge (e.g., bridge 101) is used to rectify power, the IEEE standards specify a maximum backfeed voltage that may be generated across input terminals of the inactive bridge (e.g., bridge 102), which are also coupled to (e.g., connected to, electrically coupled to) PSE 130, to prevent damage to PSE 130. In some implementations, for example, under different industry standards, the load may be greater than 25 kΩ (e.g., 30 kΩ, 100 kΩ) or less than 25 kΩ (e.g., 20 kΩ, 5 kΩ).

Also, as mentioned above, tests on PoE equipment and devices to verify compliance with the standards may be implemented to verify proper and safe operation of a variety of PoE equipment and devices. For example, the public IEEE (and other private) industry standards recommend a PD resistance detection test to verify whether the input resistance presented by the PD is standards compliant or within an acceptable range (~25 kΩ) before supplying a maximum voltage (e.g., 57 V) to any PD over an Ethernet cable (e.g., Ethernet cable 132).

Under a PD resistance detection test or scheme, to prevent damage to a PD (e.g., PD 120) that is not equipped to receive PoE power, a PSE controller (e.g., PSE controller 131) may run (e.g., execute) a discovery process (which can be referred to as a discovery mode) which searches for remote devices coupled to (e.g., connected to, electrically coupled to) data cables (e.g., Ethernet cable 132) and verifies that the remote devices (e.g., PD 120) comply with the IEEE PoE specification (e.g., IEEE 802.3af and 802.3at) before applying power to the data cables. This discovery process may involve applying small current-limited voltages to the remote devices via the bridge circuit (e.g., bridge circuit 100) and checking for the presence of, for example, a 25 kΩ resistance as the input load presented by the remote devices (e.g., PD 120). The probing voltages may be typically equal to or less than, for example, about 10.1 V and may be applied as often as, for example, every 2 milliseconds. The probing voltages applied may, for example, be about 2.7 V, 5.0 V, 7.0 V, 9.0 V and 10.0 V, and the probing frequency can be greater than 2 ms (e.g., 15 ms, 200 ms, 1 s, 10 s) or less than 2 ms (e.g., 1 ms, 10 ns). In some implementations, for example, under different or evolving industry standards, the probing voltages may be greater than 10.1 V (e.g., 15 V, 20 V, etc.).

PSE controller 131 may be configured to measure a differential change in load current ($\Delta I$) in response to a differential change in the applied probing voltage ($\Delta V$) and quantify the detected PD resistance as a differential resistance $R \approx \Delta V/\Delta I$, assuming, for example, a linear relation between voltage and current that is given by Ohms law (i.e. V=IR). Typically, PSE controller 131 probes the PD's input port (e.g., port 121) with two probing voltages that fall between, for example, 2.7 V to 10.1 V ($\Delta V > 1V$). In an example implementation, the two probing voltages may be 7 V and 10 V (with $\Delta V = 3$ V). The PSE controller 131 can be configured to verify that the incremental resistance ($\Delta V/\Delta I$) is within a guard-banded range (e.g., 23.75 kΩ to 26.25 kΩ) centered about approximately 25 kΩ. Detection of the input resistance prevents the PSE 130 from powering PDs (e.g., PD 120) that cannot accept PoE in order to avoid damaging the PDs.

If the 25 kΩ resistance value is found as the input load of PD 120, the PSE controller 131 may then apply a full voltage (e.g., 36 V to 57 V) to the data cables (e.g., Ethernet cable 132) to deliver up to a maximum power of 13 W (or 100 W) to the PD 120 as specified by the IEEE PoE standards. Power may be provided as long as the PD 120 is present and draws a minimum level of current. If the PD 120 is turned off or removed, then the PSE controller 131 may remove the power and begin executing the discovery process again.

Quantification of the detected resistance of the PD 120 as a differential resistance ($R \approx \Delta V/\Delta I$) by the PSE controller 131 is based on an assumption that the differential change in load current $\Delta I$ depends on (e.g., only on) the differential change in voltage ($\Delta V$) applied to the PD 120 via bridge circuit 100 (also can be referred to as a rectifying bridge circuit) by the PSE 130 and may not depend on a current-voltage response of components of bridge circuit 100. For diode-based bridge circuits the foregoing assumptions may be valid because a forward-biased diode can behave as a resistor with a linear current-voltage (IV) relationship.

Bridge circuit 100 is configured to account for the assumptions that are generally applied to a diode-based bridge circuit. The bridge circuit 100 is configured with MOSFET devices so that the one or more of the MOSFET devices included in the bridge circuit 100 will not turn on, in an undesirable fashion during a PD resistance detection test. When the PD resistance detection test is used with a MOSFET bridge circuit that is not properly configured, a MOSFET with a low threshold voltage (e.g., Vth<10V) can turn on, in an undesirable fashion, in response to application of the probing voltage and exhibit current gain during the test. The contribution of the MOSFET current gain to the measured differential load current ($\Delta I$) may distort and invalidate determination of the detected PD resistance by a PSE controller (e.g., the PSE controller 130) as being the measured slope $R \approx \Delta V/\Delta I$. In other words, determination of the input resistance of PD 120 for compliance with PoE system safety standards using the standard PD resistance detection test is not straightforward and may be impractical if a MOSFET in the rectifying bridge circuit (e.g., bridge circuit 100) is turned on during the test.

In accordance with the principles of the disclosure herein, bridge circuit 100, which is a MOSFET bridge circuit, is configured to be compatible with standard PD resistance detection schemes that are specified, for example, by the IEEE PoE standards.

Figure 2A:
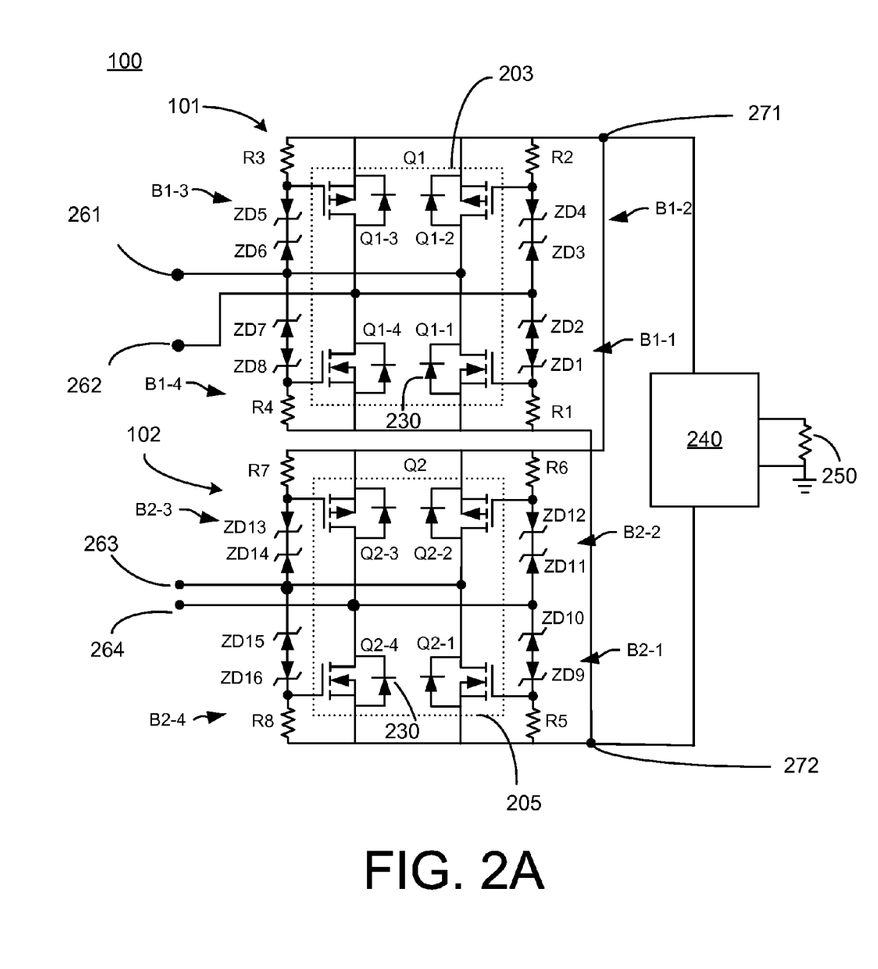
FIGS. 2A and 2B are illustrations of an example bridge circuit that is configured for compatibility with powered device (PD) resistance detection and backfeed voltage schemes.
Figure 2B:
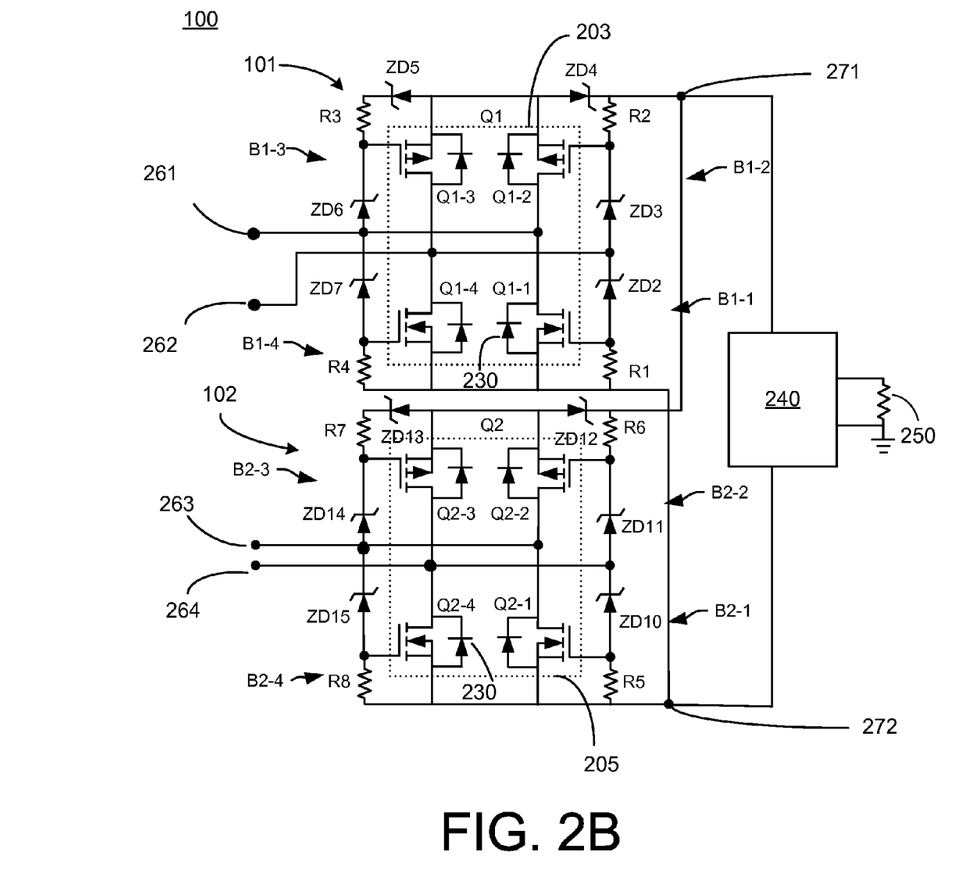

FIGS. 2A and 2B illustrate variations of the bridge circuit 100 introduced in FIG. 1, which includes bridges 101 and 102. The bridge circuits 100 are configured for compatibility with (1) standard PD resistance detection tests (e.g., schemes) up to a maximum probing voltage (e.g., 10.1 V) and (2) standard voltage backfeed tests, and yet retain the power efficiency advantage of utilizing low threshold voltage MOSFETS instead of traditional p-n diodes over most of a standard operating voltage range (e.g., up to 57 V) in a PoE application.

In the example shown, bridge 101 includes two P-channel (or P-type) MOSFETS (Q1-2 and Q1-3) and two N-channel (or N-type) MOSFETs (Q1-1 and Q1-4), which may be arranged in an integrated circuit quad structure 203 to define a bridge rectifier. MOSFETs Q1-2 and Q1-3 can be associated with a first terminal 261 (e.g., first input terminal), and a second terminal 262 (e.g., second input terminal) which can be associated with MOSFETs Q1-1 and Q1-4. Bridge 102 shown in FIGS. 2A and 2B includes a similar arrangement of a pair N-channel MOSFETS (e.g., Q2-1 and Q2-4) and P-channel MOSFETS (e.g., Q2-2 and Q2-3) in an integrated circuit quad structure 205) to define a bridge rectifier. MOSFETs Q2-2 and Q2-3 are associated with a third terminal 263 (e.g., third input terminal), and a fourth terminal 264 (e.g., fourth input terminal) can be associated with MOSFETs Q2-1 and Q2-4.

The bridge 101 is coupled in parallel to the bridge 102. In this implementation, the bridge 101 and the bridge 102 are coupled to output terminals 271, 272. In some implementations, the output terminal 271 can be referred to as a first output terminal and the output terminal 272 can be referred to as a second output terminal 272.

The MOSFETs included in bridge 101 can collectively be referred to as MOSFETs Q1, and the MOSFETs included in bridge 102 can collectively be referred to as MOSFETs Q2. All of the MOSFETs in the bridge circuit 100 can collectively be referred to as MOSFETs Q. Each of the MOSFETs Q in the bridge circuit 100 are associated with, or included in, a branch B. For example, the MOSFET Q1-1 is included in branch B1-1 and the MOSFET Q2-2 is included in branch B2-2

In some implementations, or test scenarios, for example, a positive portion of a signal (TXCT-RXCT) can be applied to the first terminal 261 and a negative portion of the applied signal (TXCT-RXCT) can be applied to the second terminal 262. In FIGS. 2A and 2B, a fixed polarity output of bridge circuit 100 (across the first output terminal 271 and the second output terminal 272) of bridge circuit 100/bridge 101 may be applied to a load 250 (which can represent a type of the PD 120 shown in, for example, FIG. 1) via a DC-DC convertor 240 (optionally included). The DC-DC convertor 240 may be configured to down convert the output (e.g., output voltage) of bridge circuit 100, for example, to an operating voltage (e.g. 5 V) that may be specified for or needed by circuits of the load 250 (or PD 120).

In some implementations, or test scenarios, for example, a positive portion of a signal ((MID+)-(MID−)) may be applied to third terminal 263, and a negative portion of the signal ((MID+)-(MID−)) may be applied to the fourth terminal 264. In the example shown in FIGS. 2A and 2B, bridge 102, which is parallel to bridge 101, may be inactive (i.e. no voltage or signal is applied across third terminal 263 and fourth terminal 264) in some implementations or test scenarios.

As mentioned above, the bridge circuit 100 (in the various variations), in addition to the rectifying arrangements of MOSFETs Q (e.g., in bridges 101 and 102), includes zener-resistor networks associated with each of the MOSFETs Q in the bridge circuit 100. The additional circuit components (e.g., zener diodes, resistors, etc.) are arranged in zener-resistor networks that prevent the MOSFETs Q in the bridge circuit 100 from turning on and contributing current to the measured differential load current (ΔI) during testing scenarios such as a PD resistance detection test (which, for example, involves probing voltages of up to about 10V). In some implementations, the zener-resistor networks included in each of the branches B can be the same or can be different for one or more of the bridges 101, 102.

Specifically, the zener-resistor networks in the variation of bridge circuit 100 shown in FIG. 2A each include an arrangement of at least a set of zener diodes (e.g., back-to-back zener diodes, a pair of zener diodes) coupled in series to a gate of at least one of the MOSFETs Q, and can include a bleed or shunt resistor connecting the gate and source of the MOSFET. More than one set of zener diodes (not shown) may be coupled in series to the gate of the at least one of the MOSFETs Q (e.g., based on considerations of a relative value of the threshold voltage Vth of the MOSFET and the breakdown voltages of the sets of zener diodes). The back-to-back zener diodes may be aligned anode-to-anode (e.g., ZD1-ZD2, ZD7-ZD8) or equivalently cathode-to-cathode (e.g., ZD3-ZD4, ZD5-ZD6). Each zener diode depicted can be implemented as a series of zener diodes. For example, zener diode ZD5, which is included in the bridge circuit 100 with a particular polarity (e.g., anode and cathode orientation or direction within the circuit), can be implemented in hardware (e.g., in a silicon substrate) as several different zener diodes with the same polarity, but serially coupled. An another example, zener diode pair ZD7-ZD8, which is included in the bridge circuit 100 with opposite polarities, can be implemented in hardware (e.g., in a silicon substrate) as several different zener diode pairs with opposite polarities, but serially coupled.

In FIG. 2A, the arrangement of zener diodes and gate-to-source resistors (in a zener-resistor network) may, for example in bridge 101, include at least one set of back-to-back zener diodes (e.g., ZD1-ZD2, ZD7-ZD8, ZD3-ZD4 and ZD5-ZD6, respectively) coupled in series to each of the gates of the MOSFETs Q1 (e.g., Q1-1, Q1-2, Q1-3, and Q1-4, respectively) and at least one gate-to-source shunt resistor (e.g., R1, R4, R2 and R3, respectively). Similarly, the zener-resistor networks may, for example in bridge 102, include at least one set of back-to-back zener diodes (e.g., ZD9-ZD10, ZD15-ZD16, ZD11-ZD12 and ZD13-ZD14, respectively) coupled in series to each of the gates of the MOSFETs Q2 (e.g., Q2-1 Q2-2, Q2-3 and Q2-4, respectively) and at least one gate-to-source shunt resistors (e.g., R5, R8, R6 and R7, respectively).

As a specific example, in bridge 101 back-to-back zener diodes ZD1-ZD2 are coupled in series to the gate of MOSFET Q1-1 and coupled to (e.g., connected to, electrically coupled to) the drains of MOSFET Q1-3 (which is a P-type MOSFET) and of MOSFET Q1-4 (which is an N-type MOSFET), and back-to-back zener diodes ZD3-ZD4 are coupled in series to the gate of MOSFET Q1-2 and coupled to the drains of MOSFET Q1-3 (which is a P-type MOSFET) and of MOSFET Q1-4 (which is an N-type MOSFET). The back-to-back zener diodes ZD3-ZD4 are coupled to the back-to-back zener diodes ZD1-ZD2. Also, back-to-back zener diodes ZD5-ZD6 are coupled in series to the gate of MOSFET Q1-3 and coupled to the drains of MOSFET Q1-2 (which is a P-type MOSFET) and of MOSFET Q1-1 (which is an N-type MOSFET), and back-to-back zener diodes ZD7-ZD8 are coupled in series to the gate of MOSFET Q1-4 and coupled to the drains of MOSFET Q1-2 (which is a P-type MOSFET) and of MOSFET Q1-1 (which is an N-type MOSFET). The back-to-back zener diodes ZD7-ZD8 are coupled to the back-to-back zener diodes ZD5-ZD6. In this implementation, the anode-to-anode zener diodes are coupled directly to the gates of the N-type MOSFETS, and the cathode-to-cathode zener diodes are coupled directly to the gates of the P-type MOSFETS. The bridge 102 is arranged in a similar fashion to bridge 101, so is not described in detail herein.

In the variation of bridge circuit 100 shown in FIG. 2B the zener-resistor networks are varied. For example, in branch B1-3, the zener-resistor network coupled to the P-channel MOSFET Q1-3 includes a resistor R3 coupled between a zener diode ZD6 and a zener diode ZD5. The zener diode ZD6 has a cathode coupled to (a first terminal) the resistor R3, and the zener diode ZD5 has a cathode coupled to (a second terminal) the resistor R3. The cathode of the zener diode ZD6 and the resistor R3 are coupled to the gate of the MOSFET Q1-3. The zener-resistor network associated with MOSFET Q1-2 (which is a P-type device) has a similar arrangement.

In the variation of bridge circuit 100 shown in FIG. 2B, the branches associated with the N-channel MOSFETs Q1-1 and Q1-4 include zener-resistor networks different than the zener-resistor networks associated with the P-channel MOSFETs Q1-2, Q1-3. For example, the zener-resistor network included in branch B1-4 includes a single zener diode ZD7 (or zener diode polarity) with an anode coupled to the resistor R4 (which can be a single resistor or set of resistors). The resistor R4 and the zener diode ZD7 are coupled to the gate of the MOSFET Q1-4. Branch B1-1 associated with MOSFET Q1-1 has a zener-resistor network similar to the zener-resistor network associated with MOSFET Q1-4. As shown in FIG. 2B, the bridge 102 has zener-resistor networks similar to those in bridge 101.

The back-to-back zener diodes in the variation in FIG. 2A are modified for the variation in FIG. 2B, so that the zener diodes that block the turn-off gate current (which has a direction the same as the gate turn-off direction) remains and the other zener diode (which has a direction opposite to gate turn-off direction) is either moved or removed. For example, the zener diode ZD5 associated with P-channel MOSFET Q1-3 is moved for blocking R-detection current and the zener diode ZD8 (shown in FIG. 2A) associated with N-channel MOSFET Q1-4 is removed. In the case of the zener diodes in the N-channel MOSFETs, the remaining zener diode (e.g., zener diode ZD7) functions to both increase turn-on voltage and block R-detection current (so one of the back-to-back zener diodes is removed from the N-channel branches). In FIG. 2B, discharge of the gates of the MOSFETs Q is through a forward-biased zener diode (e.g., or equivalent combination of zener diodes with the same polarity) (between the gate and corresponding resistor).

The variation of the bridge circuit 100 shown in FIG. 2B has a relatively fast MOSFET gate turn-off switching speed. When the polarity of an input voltage is switched abruptly (on one or more sets of the input terminals), turned-on MOSFETs Q can be turned off relatively fast to prevent shoot through of one or more of the MOSFETs Q. Specifically, the turn-off speed of the MOSFETs Q is fast because when the input voltage polarity is changed abruptly, there is a possible of the shoot through if the turn-off speed of MOSFETs Q is slow. The variation of the bridge circuit 100 shown in FIG. 2B handles resistance detection and backfeed voltage in a fashion similar to the variation of the bridge circuit 100 shown in FIG. 2A.

In some implementations, one or more of the zener-resistor networks in FIG. 2A or FIG. 2B can be combined in any combination in one or more bridges. In some implementations, the zener-resistor networks can include a variety of configurations. For example, a first zener diode in one zener-resistor network included in a bridge can have a breakdown voltage different from a breakdown voltage of a second zener diode in the same zener-resistor network or a different zener-resistor network. As another example, a first resistor diode in one zener-resistor network included in a bridge can have a resistance value different from a resistance value of a second resistor in the same zener-resistor network or a different zener-resistor network.

In some implementations, a resistor detection test is implemented within the bridge circuit 100 (and variations thereof) using the zener-resistor network configurations. For example, a 25 kΩ resistor across the load may be detected within +/−1.3 kΩ when applying between 2.7 V to 10.1 V across the input terminals (e.g., input terminals 261, 262 of bridge 101 or input terminals 263, 264 of bridge 102). The back-to-back diodes can prevent the MOSFETs Q from turning on by adjusting the threshold voltage plus the series gate zener diodes to be greater than, for example, 10.1 V (over a desirable operating temperature). Thus, the MOSFETs Q are prevented from turning on and conduction remains through the body diodes of the MOSFETs Q at both 2.7 V and 10.1 V input and the resistor detection requirements may be satisfied. Rather than using MOSFETs with relatively high threshold voltages (e.g., greater than the applied voltage (e.g., 10.1 V)), the solutions illustrated and described herein use MOSFETs Q with any threshold voltage (e.g., less than the target applied voltage (e.g., 10.1V)) by tuning the zener-resistor networks (e.g., the resistors and zener diodes, the breakdown voltages of the back-to-back zener diodes) in conjunction with the threshold voltage of the MOSFETs Q. In some implementations, a voltage drop across a zener-resistor network associated with one of the MOSFETs Q can be greater than a threshold voltage of the one of the MOSFETs Q during a resistance test.

The MOSFETs in the bridge circuit 100 (e.g., Q1-1, Q1-2, Q1-3 and Q1-4 in bridge 101, and Q2-1, Q2-2, Q2-3 and Q2-4 in bridge 102), which may have relatively low threshold voltages (e.g., Vth=~1 V to 10 V), may include intrinsic drain-to-source body diodes such as body diode 230. The body diodes (e.g., body diode 230) in bridge 101 (and also bridge 102) define a rectifier bridge configuration.

In a standard PD resistance discovery process using bridge 100 as an interface between a PSE (e.g., PSE 130) and a remote device (e.g., PD 120, load 250), when a probing voltage is first applied (e.g., to terminals 261 and 262), bridge 101 may function as rectifier bridge, in that initially current conduction may take place through a pair of body diodes 230 (e.g., body diodes 230 associated with the pair of MOSFETs Q1-2 and Q1-4). However, as soon as the voltage at the MOSFET gates exceeds the turn-on threshold of the MOSFETs Q, an appropriate pair of MOSFETs Q may turn on with current flow through the MOSFET source-drain channels, effectively bypassing the pair of body diodes 230 that was initially conducting.

Figure 3:
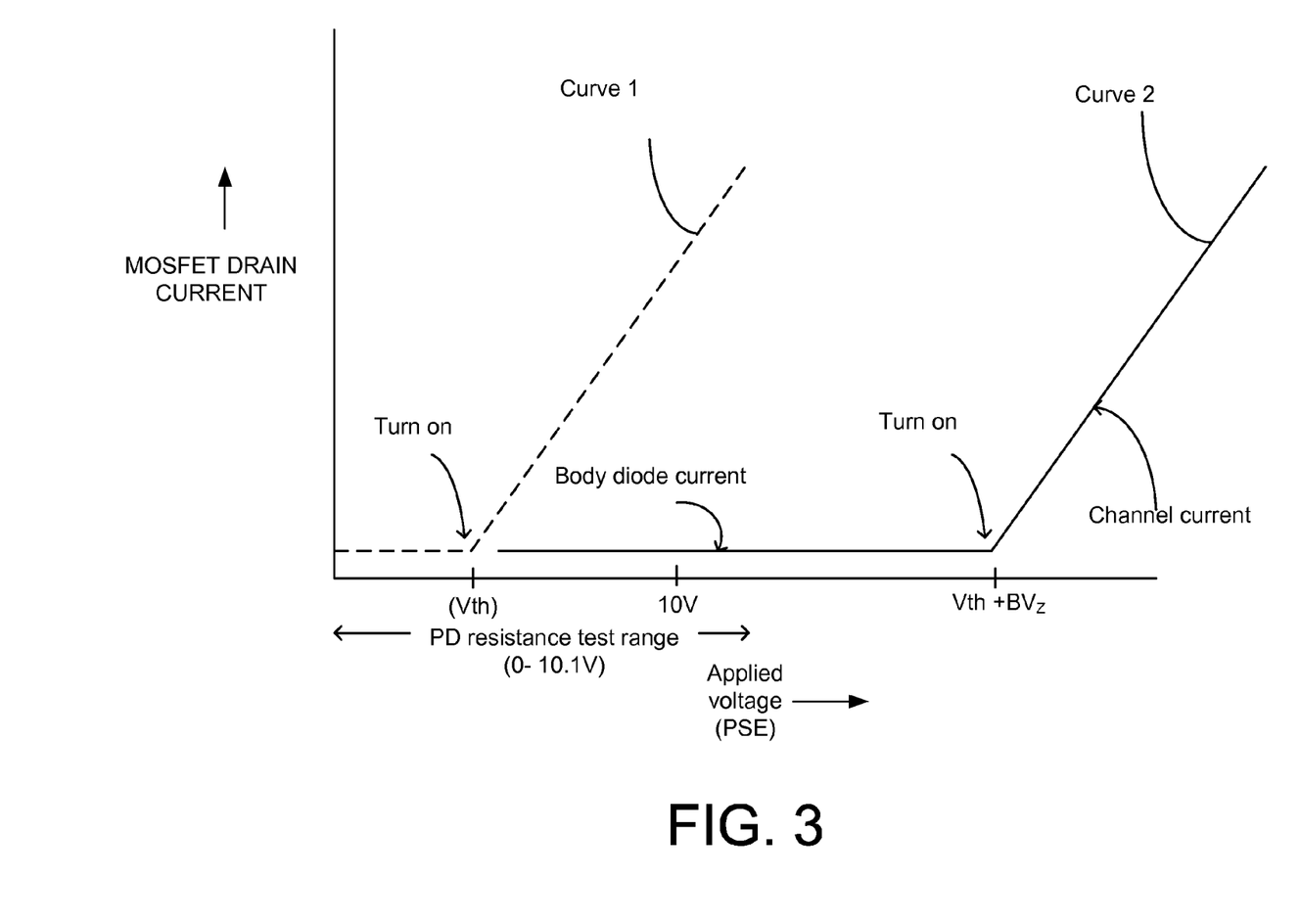
FIG. 3 is an illustration of the effect of coupling at least one zener diode to a gate of a metal-oxide-semiconductor field effect transistor (MOSFET).

FIG. 3 schematically illustrates the effect of coupling one or more zener diodes (e.g., ZD1-ZD2 shown in FIG. 2A or FIG. 2B), which may have a breakdown voltage BVz, in series with the gate of MOSFET (e.g., gate of Q1-1 shown in FIG. 2A or 2B) on the turn-on characteristics of the MOSFET (e.g., Q1-1) having a threshold voltage Vth. In the absence one or more of the zener diodes ZD1-ZD2 at least operatively coupled (either directly or through another device such as a resistor or another zener diode) to the gate of MOSFET Q1-1, the drain current in the MOSFET (as represented by curve 1 in FIG. 3) has a low value passing through the source drain body diode (e.g., body diode 230) of the MOSFET while the applied voltage is below the threshold voltage Vth as represented by curve 1 in the figure. When the applied voltage exceeds the threshold voltage Vth, MOSFET Q1-1 turns on with increasing current flow through the source-drain channel of the MOSFET. When the set of zener diodes ZD1-ZD2 in series with the gate of MOSFET Q1-1 is present, the drain current in the MOSFET (as represented by curve 2 in FIG. 3) retains a low value passing through the source drain body diode (e.g., body diode 230) of the MOSFET while the applied voltage is below the sum of threshold voltage Vth and the breakdown voltage BVz. For example, compared to curve 1, in curve 2 MOSFET turn-on point is increased and does not occur until the applied voltage exceeds Vth+BVz.

In accordance with the principles of the present disclosure, the breakdown voltages of the zener diode(s) (e.g., gate zener diodes, back-to-back zener diodes), values of gate-to-source shunt resistors, and/or the threshold voltages (Vth) of the MOSFETs Q in bridge 101 (and bridge 102) may be selected to preclude the MOSFETs Q in bridge 101 (and bridge 102) from turning on or disrupting the I-V (current-voltage) characteristics of the PD 120 under test (e.g., a 25 kΩ load) during at least a PD resistance detection test (e.g., a standard test using probing voltages up to about 10 V). Instead of relying only on high MOSFET Q threshold voltage (Vth) values (e.g., Vth>12 V) to preclude MOSFET turn-on, the breakdown voltages BVz of the zener diodes (e.g., ZD1, ZD2) may be utilized to preclude MOSFET Q turn-on during PD resistance detection test even when the MOSFET Q threshold values are low (e.g., Vth~1 to 5 V). For example, the MOSFETs Q may be prevented from turning on and current conduction kept through the (MOSFET) body diode at test probing voltages (e.g., 2.7 V to 10.1 V) by making the combination of the MOSFET threshold voltage (Vth) and the breakdown voltages BVz of the zener diode(s) to be greater than 10.1 V over the range of probing voltages used in the PD resistance detection test. For example, curve 2 in FIG. 3 illustrates the MOSFET drain current conduction through the (MOSFET) body diode 230 over the PD resistance probing voltage range of 0-10.1 V and turn-on of MOSFET Q1-1 with the back-back zener diodes ZD1-ZD2 occurring only after the applied voltage exceeds the PD resistance test voltage range of 0 to 10.1 V.

In general, the lower the threshold voltage of the MOSFETs Q, the higher the values of breakdown voltages that may be selected for one or more of the zener diodes. The breakdown voltages BVz for the zener diode(s) may be selected to compensate for the lowest Vth that may be obtained (e.g., due to process variation in the fabrication of the MOSFETs Q) in bridge circuit 100. For example, if the lowest Vth for a MOSFET Q in bridge circuit 100 because of processing variations is expected to be, for example, 3.1 V, the breakdown voltages BVz for the case of back-to-back zener diodes in bridge circuit 100 in FIG. 2A may be selected to be at least 7 V so that Vth+BVz is at least 10.1 V for any MOSFET Q in bridge circuit 100. The back-to-back nature of the zener diodes used in FIG. 2A may block application of the test voltages directly to the MOSFET gates and prevent the MOSFET devices from turning on independent of direction or polarity of the applied test voltages during the test.

Figure 4:
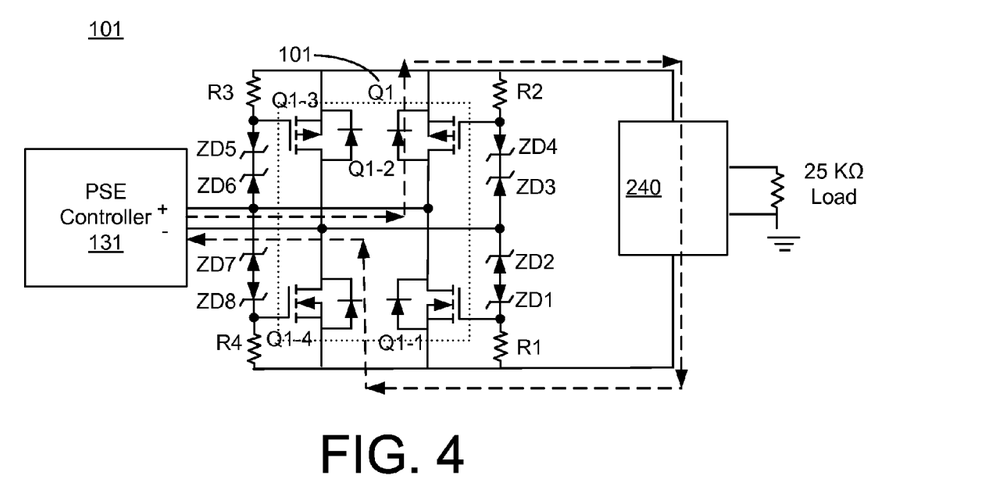
FIGS. 4 and 5 are schematic illustrations of current flowing through body diodes of MOSFETs in a bridge circuit.
Figure 5:
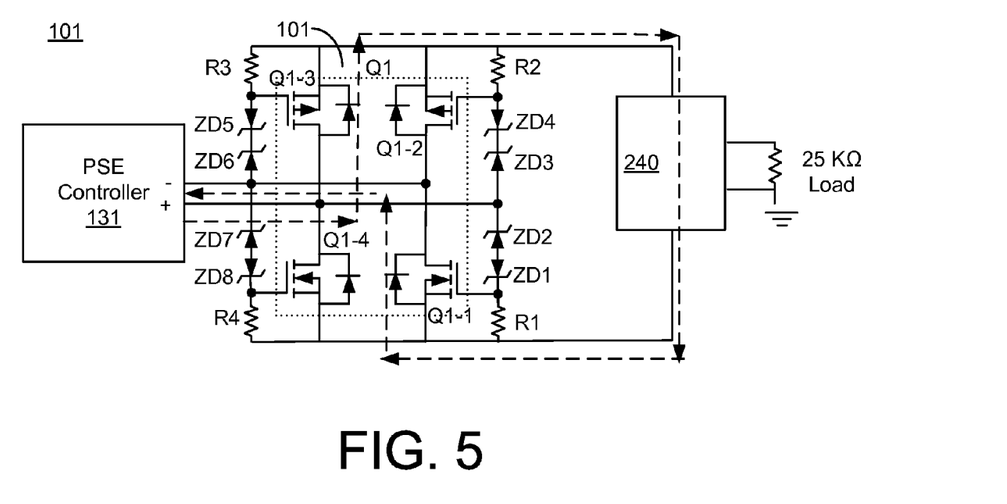

FIGS. 4 and 5 are diagrams that schematically show current flowing through the body diodes (e.g., body diodes 230) of the MOSFETs in bridge 101 when positive and negative voltages, respectively, are applied to bridge 101 by PSE controller 131 during a PD resistance test. Although FIGS. 4 and 5 are described in the context of the configuration of the bridge circuit 100 shown in FIG. 2A, the principles and configuration can be directly applied to the variation of the bridge circuit 100 shown in FIG. 2B.

FIG. 4 illustrates, for example, current (represented by dashed lines) flowing through body diodes 230 of MOSFETs of p-channel MOSFET Q1-2 and n-channel MOSFET Q1-4 when PSE controller 131 applies a positive probing voltage. Similarly, FIG. 5 illustrates, for example, current (represented by dashed lines) flowing through body diodes 230 of MOSFETs of p-channel MOSFET Q1-3 and n-channel MOSFET Q1-1 when PSE controller 131 applies a negative voltage. In either voltage polarity case, the MOSFETs (e.g., MOSFETs Q1-2 and Q1-4, and Q1-3 and Q1-1, respectively) do not turn on during the PD resistance test involving application of probing voltages of up to 10.1 V because Vth+VBz values for bridge 101 may be selected to be greater than 10.1 V (e.g., as shown in FIG. 3).

With the MOSFETs in bridge 101 remaining turned off during the PD resistance test, PSE controller 131 may measure currents I1 and I2 flowing through the PD device (e.g., PD 120) under test (e.g., a 25 kΩ load) at two applied probing voltages V1 and V2 (e.g., 7 V and 10 V). PSE controller 131 may then properly calculate the detected PD input resistance as the slope $(\Delta V/\Delta I)=(V2-V1)/(I2-I1)$. Under the IEEE standards, the detected R should be 25 kΩ±1.3 kΩ for safe transfer of power to the PD 120.

As discussed further below with reference to FIG. 6, another aspect of the zener-resistor networks (e.g., zener diode(s) and gate-to-source shunt resistors) in bridges 101 and 102 (shown in at least FIGS. 1, 2A and 2B) relates to a backfeed voltage test (ΔVbackfeed). Backfeed voltage may develop across input terminals (e.g., terminals 263 and 264 with MID+, and MID−) of an inactive bridge, which can be bridge 102 and is in parallel to an active bridge, which can be bridge 101. Under the IEEE standards, a delta voltage drop $\Delta V_{backfeed}$ across input terminals 263 and 264 of the unpowered or inactive bridge (i.e., bridge 102) should be less than +2.8V or −2.8V for a full range of output voltage Vout or operating voltage (e.g., 36 to 57V) of active bridge 101. In some implementations, the backfeed voltage can be approximately ±5% of the operating voltage. Accordingly, the zener-resistor networks (in conjunction with the threshold voltages of the MOSFETs) can be configured to limiting backfeed voltage to a range of ±5% of the operating voltage of the bridge circuit 100.

Figure 6:
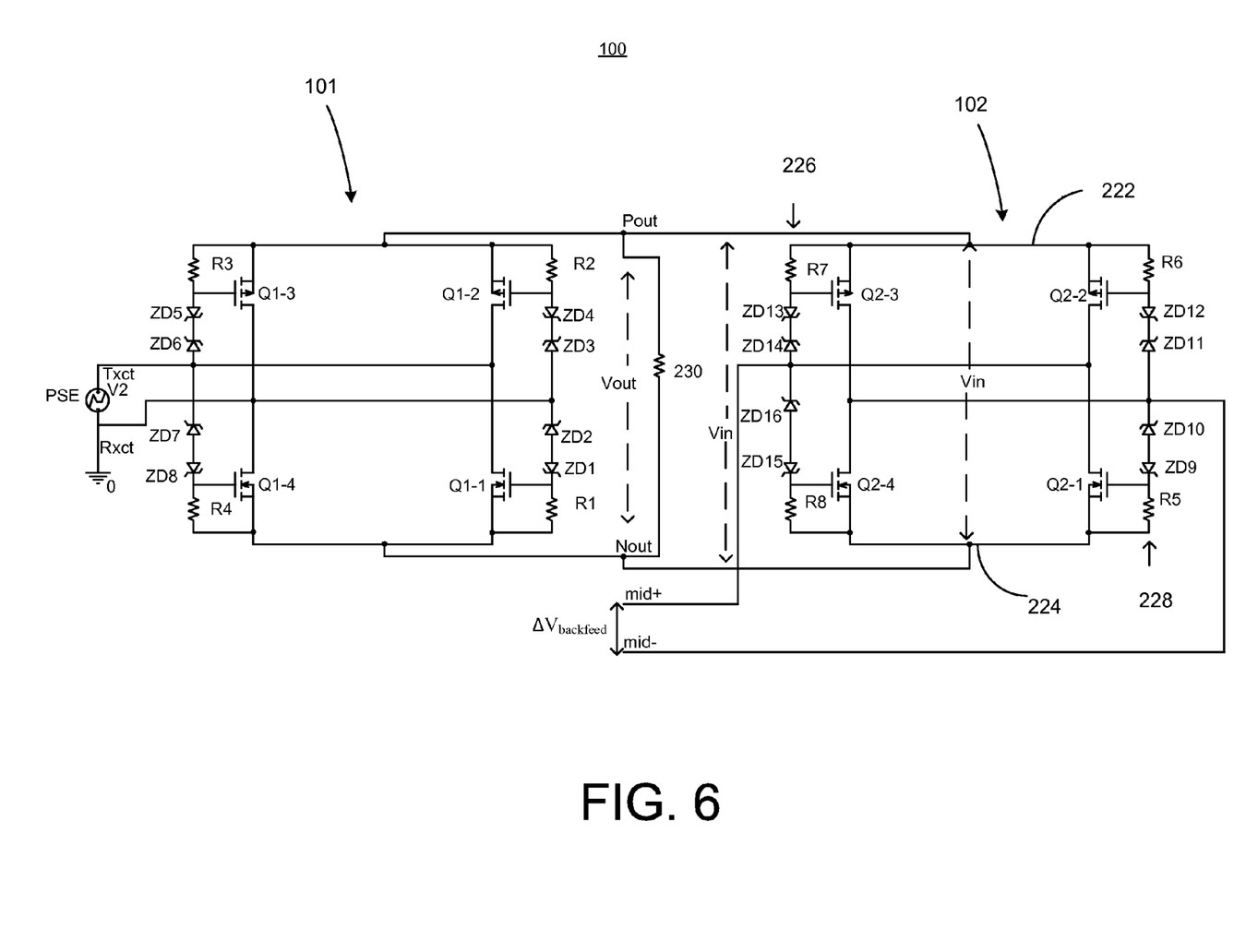
FIG. 6 is an illustration of a parallel nature of an active bridge and inactive bridge in the bridge circuit of FIGS. 2A and 2B and illustrating voltage dividers formed by an arrangement of zener diodes and resistors in the inactive bridge.

FIG. 6 illustrates another drawing of bridge circuit 100 illustrating the parallel nature of active bridge 101 and inactive bridge 102 (or vice versa) and voltage dividers 226 and 228 formed by the arrangement of back-to-back zener diodes and resistors in inactive bridge 102. Although FIG. 6 is described in the context of the variation of the bridge circuit 100 in FIG. 2A, the principles and configuration can be directly applied to the variation of the bridge circuit 100 shown, for example, in FIG. 2B.

In a PoE implementation under the IEEE standards, powered bridge 101 may be utilized to deliver rectified DC voltage Vout (e.g., =Pout-Nout) of up to about 57 V to a PD (e.g., represented by Rload 230). As shown in FIG. 6, the rectified DC voltage output Vout of active bridge 101 delivered to Rload 230 may also appear as an input voltage Vin (Vin=Vout) across rail 222 and rail 224 of inactive bridge 102 and further develop as a backfeed voltage (e.g., ΔVbackfeed) across the input terminals MID+ and MID− of inactive bridge 102.

The backfeed voltage may develop, for example, when a MOSFET (e.g., Q2-1, Q2-2, Q2-3, or Q2-4) in inactive bridge 102 turns on when Vin is applied to bridge 101. The MOSFET may turn on if a gate-source voltage Vgs applied to the gate of the MOSFET exceeds the threshold voltage Vth of the MOSFET. The gate-to-source voltage Vgs applied to the gate of a MOSFET (e.g., Q2-1, Q2-2, Q2-3, or Q2-4) in inactive bridge 102 may be approximated based on circuit theory as $$Vgs \approx 0.5*(Vin - 2*BV_Z),$$

where BVz is a breakdown voltage of a set of back-to-back zener diodes (e.g., ZD9-ZD10, ZD11-ZD-12, ZD13-ZD14 or ZD15-ZD16) coupled to (e.g., connected to, electrically coupled to) the respective gates of the MOSFETS Q2 in inactive MOSFET bridge 102. These theoretical calculations can be modified based on the zener-resistor network configuration such as that shown in FIG. 2B.

In accordance with the principles of the disclosure herein, the back-to-back zener diodes coupled to (e.g., connected to, electrically coupled to) the gates of the MOSFETs Q2 in inactive bridge 102 may be selected to have large breakdown voltages $BV_Z$ (e.g., ~25 KV) so that Vgs is smaller than the threshold voltages (Vth) of the MOSFETs Q2 even at the maximum operating voltage Vout (e.g., 57 V) and temperature allowed under the IEEE standards for a PoE application. In a case in which the MOSFETs Q2 in bridge 102 have threshold voltages Vth of about 5 V (as an example), placing back-to-back zener diodes having breakdown voltages of about 25 kV in series with the gates of the MOSFETS would ensure that the maximum Vgs applied to the gates of the MOSFETs in bridge 102 would be about≈0.5*(57−2*25) ≈3.5 V, which is less than the threshold voltages Vth of about 5 V. With Vgs<Vth, the MOSFETs Q2 (e.g., Q2-1, Q2-2, Q2-3, or Q2-4) in the inactive MOSFET bridge 202 may be expected to remain turned off even when the maximum operating voltage of, for example, 57 V is applied to MOSFET bridge 102. In some implementations, the maximum operating voltage can be less than 57 V (e.g., 20 V, 30 V). In other implementations, for example, under different or evolving industry standards, the maximum operating voltage may be greater than 57 V (e.g., 75 V, 90 V, etc.).

The MOSFETs (e.g., Q2-1, Q2-2, Q2-3, or Q2-4) when turned off may have large or infinite impedances. Further, with the MOSFETs (e.g., Q2-1, Q2-2, Q2-3, and Q2-4) remaining in a turned-off state, a delta voltage drop across the input terminals MID+ and MID− may be estimated based on circuit theory by considering voltages along a first voltage divider 226 and a second voltage divider 228, which are formed by the zener-resistor networks including resistors and back-to-back zener diodes extending between rail 222 and rail 224 of inactive bridge 102 (if applied to FIG. 2B, the voltage dividers would similarly include the zener-resistor networks in the variation of the bridge circuit 100 shown in FIG. 2B).

As shown in FIG. 6, first voltage divider 226 may include a first branch formed by resistor R7 in series with zener diodes ZD13-ZD14 extending from MID+ to rail 222 and a second branch formed by zener diodes ZD15-ZD16 in series with resistor R8 extending from MID+ to rail 224. Second voltage divider 228 may include a third branch formed by resistor R6 in series with zener diodes ZD11-ZD12 extending from MID− to rail 222 and a fourth branch formed by zener diodes ZD9-ZD10 in series with resistor R5 extending from MID− to rail 224.

Using circuit theory, the backfeed voltage $\Delta V_{backfeed}$ across terminals MID+ and MID− may be estimated to be proportional to a difference between ratios of various impedances of the first potential divider 226 and second potential divider 228. For gate-source shunt resistor values of, for example, 10 kΩ to 30 kΩ, the zener diode impedances (~10Ω-100Ω) may be negligible and the backfeed voltage may be approximated as:

$$\Delta V_{backfeed} \approx Vout*((R7)/(R7+R8) - (R6)/(R6+R5))$$

In accordance with the principles of the disclosure herein, the backfeed voltage across the input terminals MID+ and MID− of inactive bridge 102 may be limited to an acceptable value (e.g., ±2.8 V for Vin=57 V) by selecting or tuning values of the resistors (e.g., gate-to-source shunt resistors, resistors R5, R6, R7 and R8) in inactive bridge 102 to be about the same (i.e. R5≈R6≈R7≈R8) so that $\Delta V_{backfeed} \approx 0$ V or at least less than, for example, ±2.8 V for Vin=57 V.

Figure 7:
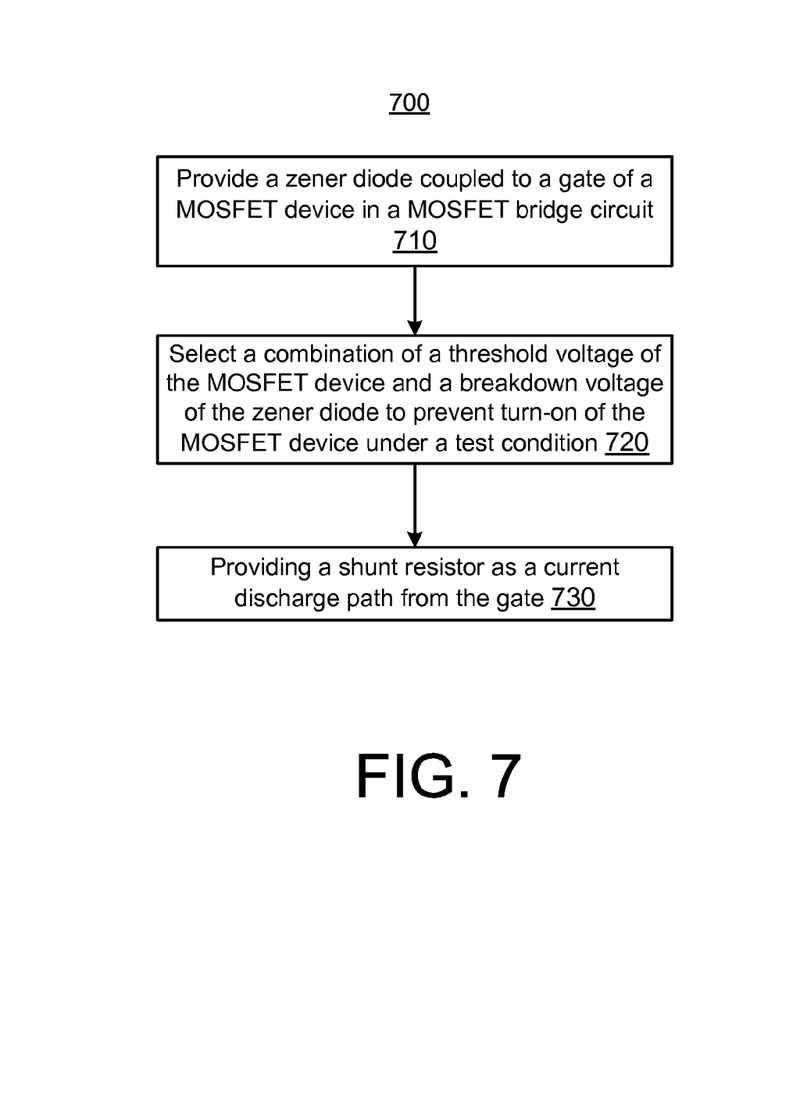
FIG. 7 is a flowchart of an example method associated with a MOSFET bridge circuit configured to handle a PD resistance detection tests.

FIG. 7 is a flowchart of an example method 700 for making a MOSFET bridge circuit amenable to PD resistance detection tests under IEEE or other standards.

Method 700 includes providing a zener diode (e.g., series gate back-to-back zener diodes) coupled to a gate of a MOSFET device in a MOSFET bridge circuit (710). The method includes selecting the combination of the threshold voltage of the MOSFET devices and breakdown voltages of the zener diode to prevent turn-on of the MOSFET devices under test conditions (e.g., 2.8 V or 10.1 V) (720). The method further includes providing a resistor (e.g., a gate-to-source shunt resistor, a bleed resistor) as a current discharge path from a gate (730).

Figure 8:
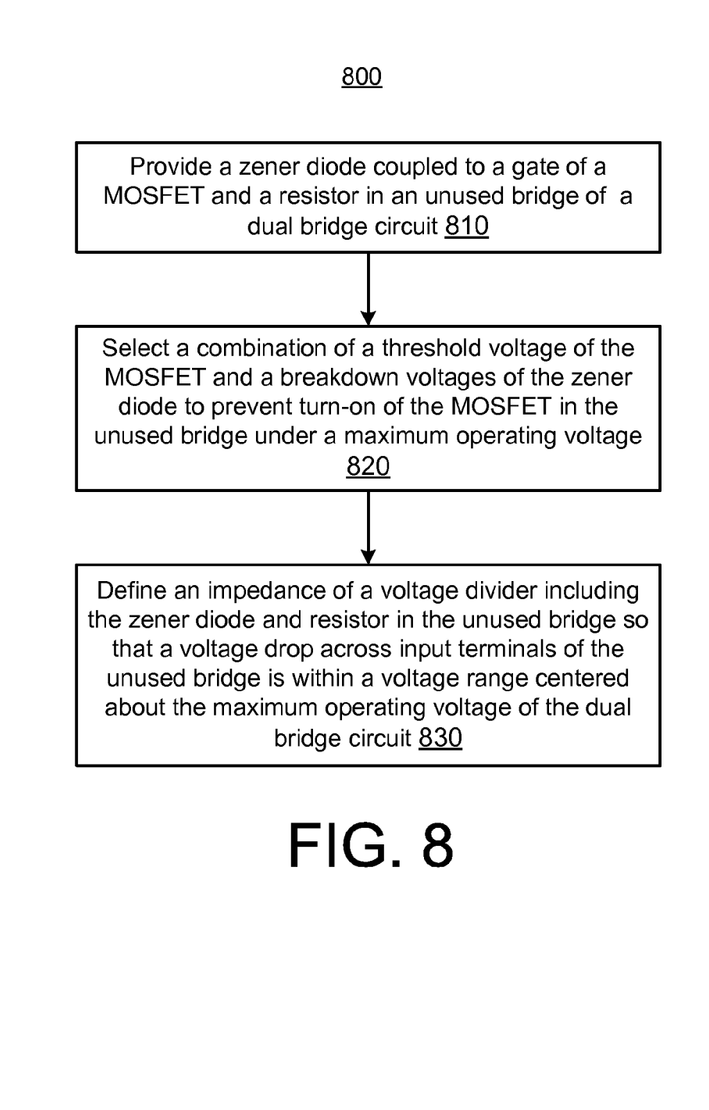
FIG. 8 is a flowchart of an example method associated with limiting a backfeed voltage.

FIG. 8 is a flowchart of an example method 800 for limiting a backfeed voltage generated across the input of an "inactive" bridge in a dual bridge circuit delivering rectified power to a remote device using a parallel "active" bridge in a dual bridge circuit. The dual bridge circuit may utilize MOSFETs as rectifying components.

Method 800 includes providing a zener diode (e.g., series gate back-to-back zener diodes) coupled to a gate of a MOSFET and a resistor (e.g., a gate-source shunt resistor) in an inactive bridge in a dual bridge circuit (810). The method includes selecting a combination of a threshold voltage of the MOSFET and a breakdown voltage of the zener diodes to prevent turn-on of the MOSFET in the inactive bridge under a maximum operating voltage (e.g., 57 V). The method further includes defining an impedance of a voltage divider including the zener diode and resistor in the inactive bridge so that a voltage drop across input terminals of the inactive bridge is within a voltage range (e.g., approximately zero, at least less than ±2.8 V) centered about the maximum operating voltage of the dual bridge circuit (830).

In implementations, the PD 120 can be, or can be included in, a variety of electronic devices or systems. The electronic device can be, or can include, for example, a laptop-type device with a traditional laptop-type form factor. In some implementations, the electronic device can be, or can include, for example, a wired device and/or a wireless device (e.g., Wi-Fi enabled device), a computing entity (e.g., a personal computing device), a server device (e.g., a web server), a mobile phone, an audio device, a motor control device, a power supply (e.g., an off-line power supply), a personal digital assistant (PDA), a tablet device, e-reader, a television, an automobile, and/or so forth. In some implementations, the electronic device can be, or can include, for example, a display device (e.g., a liquid crystal display (LCD) monitor, for displaying information to the user), a keyboard, a pointing device (e.g., a mouse, a trackpad, by which the user can provide input to the computer).

Implementations of the various techniques described herein may be implemented in digital electronic circuitry, or in computer hardware, firmware, software, or in combinations of them. Portions of methods may be performed by, and an apparatus (e.g., the input power protection device, the power management device) may be implemented within, special purpose logic circuitry, e.g., an FPGA (field programmable gate array) or an ASIC (application-specific integrated circuit).

Some implementations may be implemented using various semiconductor processing and/or packaging techniques. Some embodiments may be implemented using various types of semiconductor processing techniques associated with semiconductor substrates including, but not limited to, for example, Silicon (Si), Gallium Arsenide (GaAs), Silicon Carbide (SiC), and/or so forth. In some implementations, the MOSFET devices can include Silicon Carbide MOSFET devices having, for example, a high-k dielectric.

While certain features of the described implementations have been illustrated as described herein, many modifications, substitutions, changes and equivalents will now occur to those skilled in the art. It is, therefore, to be understood that appended claims, when included, are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A bridge circuit, comprising:
a first bridge including a first plurality of MOSFETs and including a first input terminal and a second input terminal;
a second bridge including a second plurality of MOSFETs and including a third input terminal and a fourth input terminal, the first bridge and the second bridge being coupled in parallel and being coupled to a first load terminal and a second load terminal;
a resistor coupled between a gate and a source of a MOSFET from the first plurality of MOSFETs in the first bridge;
a first zener diode coupled to the resistor and directly coupled to the first input terminal; and
a second zener diode coupled to the resistor such that the resistor is electrically disposed between the first zener diode and the second zener diode,
the first zener diode, the second zener diode, and the resistor, in conjunction with a turn-on threshold voltage (Vth) of the at least one of the MOSFETs in the first plurality of MOSFETs, is configured to limit a feed back voltage across the third terminal and the fourth terminal when an operating voltage is applied across the first terminal and the second terminal.

2. The bridge circuit of claim 1, wherein the first zener diode has a cathode coupled to a first terminal of the resistor, and the second zener diode has a cathode coupled to a second terminal of the resistor.

3. The bridge circuit of claim 1, wherein the MOSFET is a P-channel MOSFET,
the first plurality of MOSFETs includes an N-channel MOSFET associated with a zener-resistor network including a single resistor and a single zener diode polarity.

4. The bridge circuit of claim 1, wherein the first MOSFET is a P-channel MOSFET, and the resistor is a first resistor,
the first plurality of MOSFETs includes an N-channel MOSFET having a gate coupled to a second resistor and an anode of a third zener diode.

5. The bridge circuit of claim 1, wherein the resistor is a gate-to-source shunt resistor coupled to the gate of the MOSFET and the first load terminal.

6. The bridge circuit of claim 1, wherein the zener diodes and resistor are monolithically integrated with the MOSFET in a substrate.

7. The bridge circuit of claim 1, wherein the resistor, the first zener diode and the second zener diode are configured to prevent turn-on of the MOSFET from the first plurality of MOSFETs during a resistance test.

8. The bridge circuit of claim 1, the resistor, the first zener diode, and the second zener diode being collectively configured to limit a backfeed voltage associated with the third input terminal and the fourth input terminal.

9. A bridge circuit, comprising:
a first bridge including a first plurality of MOSFETs and including a first input terminal and a second input terminal;
a second bridge including a second plurality of MOSFETs and including a third input terminal and a fourth input terminal, the first bridge and the second bridge being coupled in parallel and being coupled to a first load terminal and a second load terminal; and
a zener-resistor network coupled to a gate of at least one of the MOSFETs in the first plurality of MOSFETs in the first bridge, the zener-resistor network having at least a portion directly coupled to the first input terminal,
the zener-resistor network including at least one zener diode and a resistor, the resistor being coupled between the gate and a source of the at least one of the MOSFETs, each of the first plurality of MOSFETs having a threshold voltage less than a maximum voltage applied during a resistance detection test,
the zener-resistor network, in conjunction with a turn-on threshold voltage (Vth) of the at least one of the MOSFETs in the first plurality of MOSFETs, is configured to limit a feed back voltage across the third terminal and the fourth terminal when an operating voltage is applied across the first terminal and the second terminal.

10. The bridge circuit of claim 9, wherein the zener-resistor network includes a set of back-to-back zener diodes and a gate-source shunt resistor each coupled to the gate of the at least one of the MOSFETs in the first plurality of MOSFETs in the first bridge.

11. The bridge circuit of claim 9, wherein the zener diode has a breakdown voltage defined such that the at least one of the MOSFETs in the first plurality of MOSFETs in the first bridge is prevented from turning on when a test voltage of up to about 10.1 V is applied across the first terminal and the second terminal.

12. The bridge circuit of claim 9, wherein the zener-resistor network is configured to limit a backfeed voltage across the third terminal and the fourth terminal in a range of about ±5% of the operating voltage.

13. A circuit, comprising:
a Metal Oxide Semiconductor Field Effect Transistor (MOSFET) bridge, including:
a first input terminal and a second input terminal;
a first load terminal and a second load terminal;
a plurality of MOSFETs including a first MOSFET, a second MOSFET, a third MOSFET and a fourth MOSFET;

a source-drain channel of the first MOSFET coupled to the first input terminal and to the second load terminal, a source-drain channel of the second MOSFET coupled to the first input terminal and the first load terminal, a source-drain channel of the third MOSFET coupled to the second input terminal and the first load terminal, a source-drain channel of the fourth MOSFET coupled to the second input terminal to the second load terminal;

a first pair of zener diodes including:
   a first zener directly coupled to the first input terminal, and
   a second zener diode connected to a gate of the third MOSFET and connected to the first zener diode, a second pair of zener diodes including:
   a third zener diode coupled to the first input terminal and the first zener diode, and
   a fourth zener diode connected to a gate of the fourth MOSFET and connected to the third zener diode; and a gate-source shunt resistor coupled between the gate and a source of the third MOSFET.

14. The circuit of claim 13, wherein the pair of zener diodes is configured to reduce a gate-source voltage $V_{GS}$ applied to the third MOSFET in the MOSFET bridge independent of a polarity of a supply voltage applied across the first input terminal and the second input terminal.

15. The circuit of claim 13, wherein the gate-source shunt resistor is a first gate-source shunt resistor, the circuit further comprising:
   a second gate-source resistor coupled to the gate of the second MOSFET; and
   a third gate-source resistor coupled to a gate of the fourth MOSFET.

16. The circuit of claim 13, wherein the plurality of MOSFETs are associated with respective turn-on threshold voltages (Vth), the first pair of zener diodes have zener breakdown voltages that are sufficiently large in conjunction with value of the gate-source shunt resistor coupled to the gate of the third MOSFET to prevent turn-on of the third MOSFET in the circuit under a test condition.

17. The circuit of claim 13, wherein the MOSFET bridge is a first MOSFET bridge, the circuit further comprising:
   a second MOSFET bridge coupled to the first load terminal and the second load terminal in parallel with the first MOSFET bridge, the second MOSFET bridge having a third terminal and a fourth terminal.

18. The circuit of claim 17, wherein the first pair of zener dioes and the second pair of zener diodes are configured to limit a backfeed voltage across the third terminal and the fourth terminal of the second MOSFET bridge.

19. The bridge circuit of claim 9, wherein the zener-resistor network includes a first zener diode separated by at least a gate-source shunt resistor from a second Zener diode.

* * * * *

UNITED STATES PATENT AND TRADEMARK OFFICE
CERTIFICATE OF CORRECTION

PATENT NO. : 9,509,227 B2  
APPLICATION NO. : 14/593691  
DATED : November 29, 2016  
INVENTOR(S) : Yedinak et al.

Page 1 of 1

It is certified that error appears in the above-identified patent and that said Letters Patent is hereby corrected as shown below:

On the Title Page

Column 1, item (72), in "Inventors", Line 2, delete "Humlock" and insert -- Hunlock --, therefor.

In the Claims

In Column 14, Line 14, Claim 8, delete "1," and insert -- 1, wherein --, therefor.

In Column 16, Line 22, Claim 18, delete "dioes" and insert -- diodes --, therefor.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*